United States Patent [19]

Pauli et al.

[11] Patent Number: 5,061,474

[45] Date of Patent: Oct. 29, 1991

[54] AMORPHOUS ALUMINUM OXIDES, METHODS OF PRODUCTION AND USES

[75] Inventors: Ingo Pauli, Alzenau; Peter Kleinschmit, Hanau; Rudolf Schwarz, Alzenau-Wasserlos, all of Fed. Rep. of Germany

[73] Assignee: Degussa AG, Frankfurt am Main, Fed. Rep. of Germany

[21] Appl. No.: 436,246

[22] Filed: Nov. 14, 1989

[30] Foreign Application Priority Data

Nov. 15, 1988 [DE] Fed. Rep. of Germany ....... 3838675

[51] Int. Cl.$^5$ .............................................. C01F 7/02
[52] U.S. Cl. ..................................... 423/625; 501/153
[58] Field of Search ......................... 423/625; 501/153

[56] References Cited

U.S. PATENT DOCUMENTS

| | | | |
|---|---|---|---|
| 3,038,784 | 6/1962 | Torkar et al. | 423/629 |
| 3,867,312 | 2/1975 | Stephens | 423/625 |
| 3,887,492 | 6/1975 | Hayes | 423/625 |
| 3,887,493 | 6/1975 | Hayes | 423/625 |
| 3,941,719 | 3/1976 | Yoldas | 423/625 |
| 3,944,658 | 3/1976 | Yoldas | 423/625 |
| 4,154,812 | 5/1979 | Sanchez et al. | 423/625 |
| 4,371,513 | 2/1983 | Sanchez et al. | 423/628 |
| 4,708,945 | 11/1987 | Murrell et al. | 423/625 |
| 4,750,992 | 6/1988 | Romine | 423/625 |
| 4,770,869 | 9/1988 | Misra et al. | 423/625 |

FOREIGN PATENT DOCUMENTS 1432107 4/1976 United Kingdom .
2190666 11/1987 United Kingdom .

*Primary Examiner*—Theodore Morris
*Assistant Examiner*—Edward Squillante
*Attorney, Agent, or Firm*—Beveridge, DeGrandi & Weilacher

[57] ABSTRACT

X-ray amorphous, aluminum oxide which exhibits a specific surface area (BET) according to DIN 66 131 of $>10$ m$^2$/g, an average particle size of $\geq 0.1$ μm and a water content of $>10\%$. The X-ray amorphous aluminum oxide can be produced by reacting water vapor and vaporous aluminum trichloride in a molar ratio of 1.5 to 10:1, preferably $7\pm 1:1 = $H$_2$O:AlCl$_3$ at a temperature of 200° to 1000° C., preferably 600°$\pm$50° C. and at a dwell time of $>1$ sec., preferably $3.5\pm 1$ sec. and a partial vacuum of $100\pm 10$ mm H$_2$O column. By means of calcination thereof an aluminum oxide can be obtained which consists of $\geq 90\%$ by weight of α-aluminum oxide and exhibits a specific surface area (BET) according to DIN 66 131 of $>5$ m$^2$/g and an average particle size of $\geq 0.1$ μm.

5 Claims, No Drawings

AMORPHOUS ALUMINUM OXIDES, METHODS OF PRODUCTION AND USES

INTRODUCTION AND BACKGROUND

The present invention relates to an X-ray-amorphous aluminum oxide, the method of its production and its use.

It is known that X-ray-amorphous aluminum oxide can be produced by transporting aluminum hydroxide at a temperature of 400° to 475° Kelvin with a gas and then treating it on a heat exchanger at 725° to 825° Kelvin. The product obtained can be converted at a temperature of 1275° Kelvin into α-aluminum oxide (DD-PS 25 05 21).

This known method has the disadvantage that a large amount of energy must be used to remove the large amounts of water. It is also difficult to obtain a purely amorphous substance, which, for its part, is the prerequisite for a pure α-aluminum oxide.

SUMMARY OF THE INVENTION

An object of the invention is to provide an X-ray-amorphous, aluminum oxide having a high water content and, further, which exhibits a specific surface area (BET) according to DIN 66 131 of $>10$ m$^2$/g, an average particle size of $\geq 0.1$ μm and a water content of $>10\%$.

This X-ray-amorphous aluminum oxide can be used with advantage as a catalytic carrier and as a fire-retarding filler.

Another object of the invention is to provide a method of producing the X-ray-amorphous, aluminum oxide with an extremely high water content and having a specific surface area (BET) according to DIN 66 131 of $>10$ m$^2$/g, an average particle size of $\geq 0.1$ μm and a water content of $>10\%$. The method features reacting together water vapor and vaporous aluminum trichloride in a molar ratio of 1.5 to 10:1, preferably $7\pm 1:1 = H_2O: AlCl_3$ at a temperature of 200° to 1000° C., preferably 600±50° C. and at a dwell time of $>1$ sec., preferably 3.5±1 sec. and a partial vacuum of 100±10 mm H$_2$O column in comparison to normal pressure.

In a more detailed aspect of the invention, the aluminum oxide consists of $\geq 90\%$ by weight of α-aluminum oxide and exhibits a specific surface area (BET) according to DIN 66 131 of $>5$ m$^2$/g, preferably 10 to 20 m$^2$/g and an average particle size of $\geq 0.1$ μm.

This aluminum oxide can be used with advantage as a polishing agent and as a high-temperature thermal insulation.

A still further aspect of the invention resides in the method of producing aluminum oxide consisting of $\geq 90\%$ by weight of α-aluminum oxide and exhibiting a specific surface area (BET) according to DIN 66 131 of $>5$ m$^2$/g and an average particle size of $\geq 0.1$ μm which is characterized in that the X-ray-amorphous aluminum oxide according to claim 1 is calcined at a temperature of 1200° to 1300° C.

The calcination can be carried out in an embodiment of the invention without direct isolation of the X-ray-amorphous aluminum oxide directly following the synthesis.

DETAILED DESCRIPTION OF THE INVENTION

The following examples serve to illustrate the invention.

EXAMPLE 1

Aluminum trichloride and water are evaporated. Both gases are introduced via separate lines in a molar ratio of H$_2$O:AlCl$_3$ = 5:1 simultaneously and in a continuous manner into a tubular reactor of conventional design.

The tubular reactor is heated by an external heating to a temperature of 600° C.

The dwell time of the two gases in the reactor is 8 sec., during which time a partial vacuum of 100 mm water column is maintained in the reactor. The product is trapped by means of a conventional Teflon filter.

The aluminum oxide obtained is X-ray-amorphous and exhibits an average particle size of 1 μm. The particle sizes range between 0.1 and 10 μm.

The specific surface area (BET) according to DIN 66 131 is 11 m$^2$/g.

The ignition loss is 16.4 by weight H$_2$O.

EXAMPLE 2

The X-ray-amorphous aluminum oxide according to example 1 is calcined at 1350° C. for 1 minute.

The product obtained consists of $\geq 90\%$ by weight of α-Al$_2$O$_3$. The specific surface area (BET) according to DIN 66 131 is 11 m$^2$/g.

The average particle size is 9.53 μm and the particle sizes range between 1 and 30 μm.

The specific surface area (BET) is measured according to DIN 66 131 using nitrogen (Arlameter) for all indicated substances.

The determination of particle size is carried out according to REM photos or the Cilas method.

The ignition loss is determined at 1300° C. for 3 hours.

Further modifications and variations of the foregoing will be apparent to those skilled in this art and are intended to be encompassed by the appended claims.

We claim:

1. X-ray amorphous, aluminum oxide having a specific surface area BET according to DIN 66 131 of $>10$ m$^2$/g, an average particle size of 1 μm, the particle size in the range of 0.1 μm to 10 μm, and a water content of $>10\%$.

2. The aluminum oxide according to claim 1 having a specific surface area of 11 m$^2$/g.

3. Aluminum oxide which contains $\geq 90\%$ by weight of -aluminum oxide and exhibits a specific surface area BET according to DIN 66 131 of $>5$ m$^2$/g and an average particle size of 9.53 micrometers and the particle size is in the range of 1 to 30 micrometers.

4. An x-ray amorphous aluminum oxide having a specific surface area according to the method of Brunauer, Emmett and Teller as measured by the DIN 66 131 of greater than 10m$^2$/g, an average particle size of 1 micrometer, the particle size in the range of 0.1 to 10 micrometers and a water content of greater than 10% made by a process comprising:

reacting water vapor and vaporous aluminum trichloride in a molar ratio of 1.5 to 10:1, at a temperature of 200° to 1000° C., and a dwell time of greater than 1 second, and a partial vacuum of 100±10 mm H$_2$O column in comparison to normal pressure.

5. Aluminum oxide which contains greater than or equal to 90% by weight of alpha-aluminum oxide and exhibits a specific surface area according to the method of Brunauer, Emmett and Teller as determined by DIN 66 131 of greater than 5 m²g and an average particle size of 9.53 micrometers, and the particle sizes in the range of 1 to 30 micrometers made by a method which comprises:

reacting water vapor and vaporous aluminum trichloride in a molar ratio of 1.5 to 10:1, at a temperature of 200° to 1000° C., and a dwell time of greater than 1 second, and a partial vacuum of 100±10 mm H₂O column in comparison to normal pressure to thereby produce an x-ray amorphous aluminum oxide, and thereafter calcining at a temperature of 1200° to 1300° C.

* * * * *